United States Patent [19]
Malueg

[11] 3,949,162
[45] Apr. 6, 1976

[54] DETECTOR ARRAY FIXED-PATTERN NOISE COMPENSATION

[75] Inventor: Richard M. Malueg, Glendora, Calif.

[73] Assignee: Actron Industries, Inc., Monrovia, Calif.

[22] Filed: Feb. 25, 1974

[21] Appl. No.: 445,802

[52] U.S. Cl. .......................... 178/7.1; 178/DIG. 12
[51] Int. Cl.² ...................... H04N 5/30; H04N 5/21
[58] Field of Search ................ 178/7.1, 7.2, DIG. 12

[56] References Cited
UNITED STATES PATENTS

| | | | |
|---|---|---|---|
| 3,584,146 | 6/1971 | Catt et al. | 178/7.1 |
| 3,629,499 | 12/1971 | Carlson | 178/DIG. 12 |
| 3,790,705 | 2/1974 | Kamin | 178/7.1 |
| 3,800,079 | 3/1974 | McNeil et al. | 178/7.1 |
| 3,814,847 | 6/1974 | Longuet | 178/7.1 |
| 3,830,972 | 8/1974 | Slverling et al. | 178/7.1 |

*Primary Examiner*—Robert L. Richardson
*Attorney, Agent, or Firm*—Marvin H. Kleinberg

[57] ABSTRACT

Fixed pattern noise compensation is provided for an array of detectors by premeasuring output signals of the detectors under a low (preferably at virtually absolute zero) level of uniform incident energy, converting the measured signal level of each detector to digital signals, and storing the digital signals in a memory for reading out in synchronism with scanning outputs of the detectors during normal system operation. The digital compensation signals are converted to analog form and subtracted from the output signals of the respective detectors during each successive scan cycle of the system operation. To eliminate error from random noise, several noise measurements may be averaged to produce the fixed pattern noise compensation signals.

14 Claims, 6 Drawing Figures

DETECTOR ARRAY FIXED-PATTERN NOISE COMPENSATION

BACKGROUND OF THE INVENTION

This invention relates to detector array systems and more particularly to an array of detectors which tends to have a fixed pattern noise in addition to random noise associated with signal outputs from the detectors.

There is an ever-increasing interest in solid-state imaging systems. These solid-state systems eliminate the need for a target electrode in conventional vidicon tubes, thus increasing basic resolution and speed capability. Upon being exposed to a light image, the typical photodetector collects the released photocharge in a p-n junction capacitance. The charge pattern can be read out without a scanning electron beam. Advantages are higher geometric accuracy, high sensitivity, higher scan rates, small size, low voltage, low power and solid-state ruggedness and reliability. Electronic circuits needed to scan the array can be formed on the silicon wafer while the array of p-n junction photodetectors is being formed using the most advanced integrated circuit technology. Such arrays are commercially available in both linear and rectangular configurations.

A typical array consists of p-n junction diodes produced in a silicon wafer as an integrated circuit with a quartz window. Each diode has inherent capacitance and an area which varies by as much as five percent, or more, from diode to diode. Each diode is connected to an output video line by an access switch, made from an MOS field-effect transistor. A shift register is provided to sequentially turn on the access switches. In the case of a rectangular array, a second shift register can be employed to switch the output of the first shift register from one row of access switches to the next as the array is scanned row by row.

As each access switch is turned on, the inherent capacitance of its associated diode is recharged back to the video output line potential, thus replacing the charge displaced by the photocharge. The replaced charge is amplified by a charge (trans-impedance) amplifier. Once the addressing switch is again turned off, the diode capacitance will begin to discharge due to further photocurrent. The amount of discharge is proportional to the intensity of the light impinging the diode during the entire period before the access switch is again turned on. The resulting signal at the video output is a train of pulses, each pulse having an amplitude proportional to the integrated light flux impinging the diode.

The recording and/or display of the video output is conventional for such discrete sampling systems. Typically, a sample-and-hold circuit is employed to hold the amplitude of each pulse in succession to provide continuity from pulse to pulse. In practice, it is desirable to provide an integrator between the charge amplifier and the sample-and-hold circuit, and to then quantize the sample for digital control of the recording or display device.

Pulses driving the linear array addressing register are used to synchronize the recording or display device. In the case of a rectangular array, the output of a second register may be employed to synchronize the display or recording of successive rows. When all the rows have been displayed side by side, the entire cycle is repeated.

To provide for an area image with a linear array, the optics focusing the image onto the array are turned at just the proper rate to match up successive line images. This basic drive relationship is then used to generate signals for a display device, such as a cathode-ray tube or further to generate a speed command for a film recording system.

It has been found thus far that such solid-state imaging systems produce an image which is just comparable to conventional vidicon tubes. The reason is that the area under each video pulse is indicative of the amount of integrated photocurrent augmented by the random noise present in the diode and the clock noise introduced by switching the access switch on.

The switching noise is the most serious contributing factor to distortion of the video output because the MOS transistor has associated with it junction capacitance between the gate and source electrodes. Such capacitance will couple a subsstantial charge from the switching control signal into the video output line. Other switching devices, such as junction transistors, could have an even greater problem. There are circuit techniques which may be employed to decrease this error, but such techniques will only provide a first order correction. That is because such techniques rely on introducing a compensating charge, but the junction capacitance is not the same for every switch and diode combination so there will be some residual error in the compensation of most diodes. The combined effects of variations in the (1) switch capacitance and (2) clock noise of the diodes in the array present a fixed pattern noise problem.

SUMMARY OF THE INVENTION

In accordance with the present invention, a detector array is provided with conventional means for sequentially switching discrete detectors to an output terminal in a fixed pattern. The fixed pattern noise inherent in the combination of the array and the switching means is compensated by first operating the switching means to scan the array through one fixed pattern cycle, and measuring the output signal derived from each detector under a low, uniform level of incident energy, and preferably with no energy incident on the detectors. This may be done by simply capping the system employed to focus the energy onto the array while switching all detectors of the array to an output terminal in sequence during one raster cycle. The noise signals thus sampled from successive detectors are converted to digital form and stored in a fixed pattern of digital memory means. To eliminate error from random noise, a number of noise measurements may be made and averaged to produce the fixed noise pattern compensation signals. During normal system operation, the cap is removed and as the array is continually scanned in the fixed pattern, the corresponding digital noise signal of each detector is read from memory, converted to analog form and subtracted from the output signal then being derived from the detector.

While an exemplary embodiment will be described with reference to an array of photodetectors, and specifically an array of p-n junction diodes, it is recognized that the same problem is experienced with other types of detectors, such as particle detectors, sonic detectors, radiation detectors, and the like. Hence, the novel features that are considered characteristic of this invention will be set forth with particularity in the appended claims.

DESCRIPTION OF THE PREFERRED EMBODIMENTS

Figure 1:
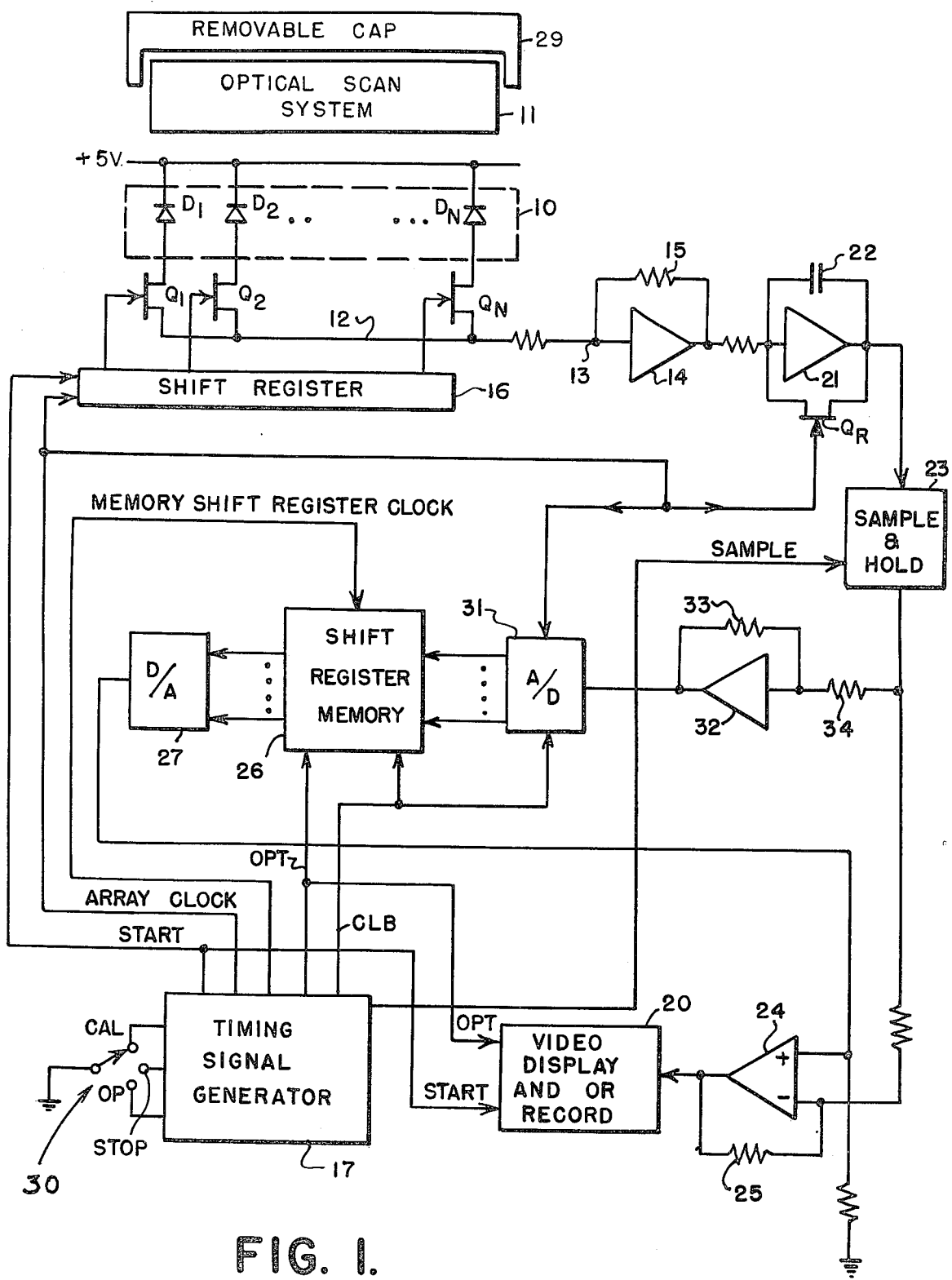
FIG. 1 is a block diagram illustrating the principles of the present invention in a linear array photodiode imaging system.

Referring to the drawings, an imaging system embodying the present invention is illustrated in FIG. 1. The system includes a linear array 10 of photodetectors, which are shown by way of example and not by way of limitation to be p-n junction diodes $D_1$ through $D_N$ and an optical scanning system 11 for focusing a light image in the plane of the array and deflecting the focused image over the array. This optical scanning system includes a table which rotates at a uniform rate synchronized with the scanning cycles of the array.

A linear array has been selected to illustrate the principles of the present invention because, as will become apparent from the following description, the principles are fully demonstrated with just a linear array. Those principles are directly applicable to a rectangular array since in both cases the train of video pulses on a common output line are derived from diodes repeatedly scanned in a fixed pattern.

In series with each photodiode $D_1$ through $D_N$ is an MOS-type field-effect transistor having its drain connected to the anode of the diode and its source connected to a common video output line 12. That line is connected to the summing junction 13 of a transimpedance (charge or current) amplifier comprised of an operational amplifier 14 having a feedback resistor 15. When power is first applied to the system and the first scan is performed, the diode junction capacitances are charged to +5V by the amplifier 14, the summing junction of which is at virtual ground. All diodes are thus expected to be initially charged to +5V, cathode-to-anode, and each diode will begin to discharge in response to photocurrent from one scan cycle to the next, i.e., the anode potential will begin to increase from ground toward +5V.

Figure 2:
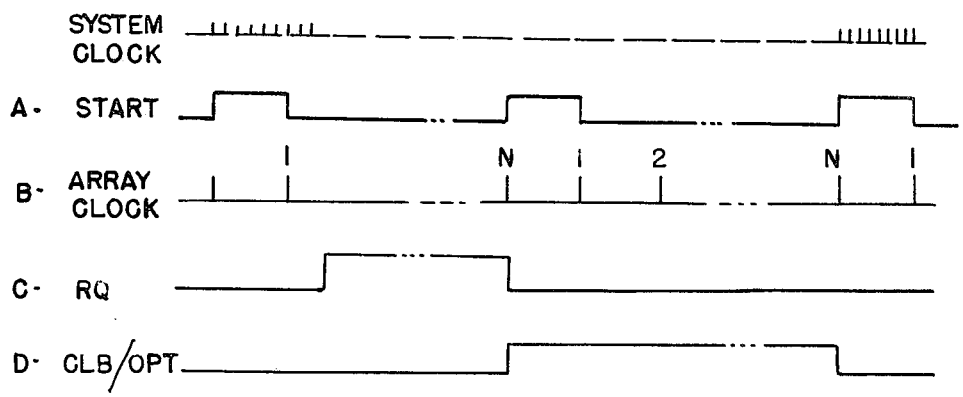
FIG. 2 is a system timing diagram helpful in understanding the general organization of an exemplary embodiment.

A shift register 16 receives an initial START pulse from a flip-flop in a timing signal generator 17 to set up an input bit 1 which is shifted into the first stage of the shift register by an array clock. The START and ARRAY CLOCK pulses are shown in waveforms A and B of FIG. 2. The ARRAY CLOCK pulses are also shown in waveform A of FIG. 3. The trailing edges of the array clock pulses shift the one bit in the register 16 through successive stages to turn the access (commutating) switches $Q_1$ through $Q_N$ on in sequence during one linear scan cycle.

Figure 3:
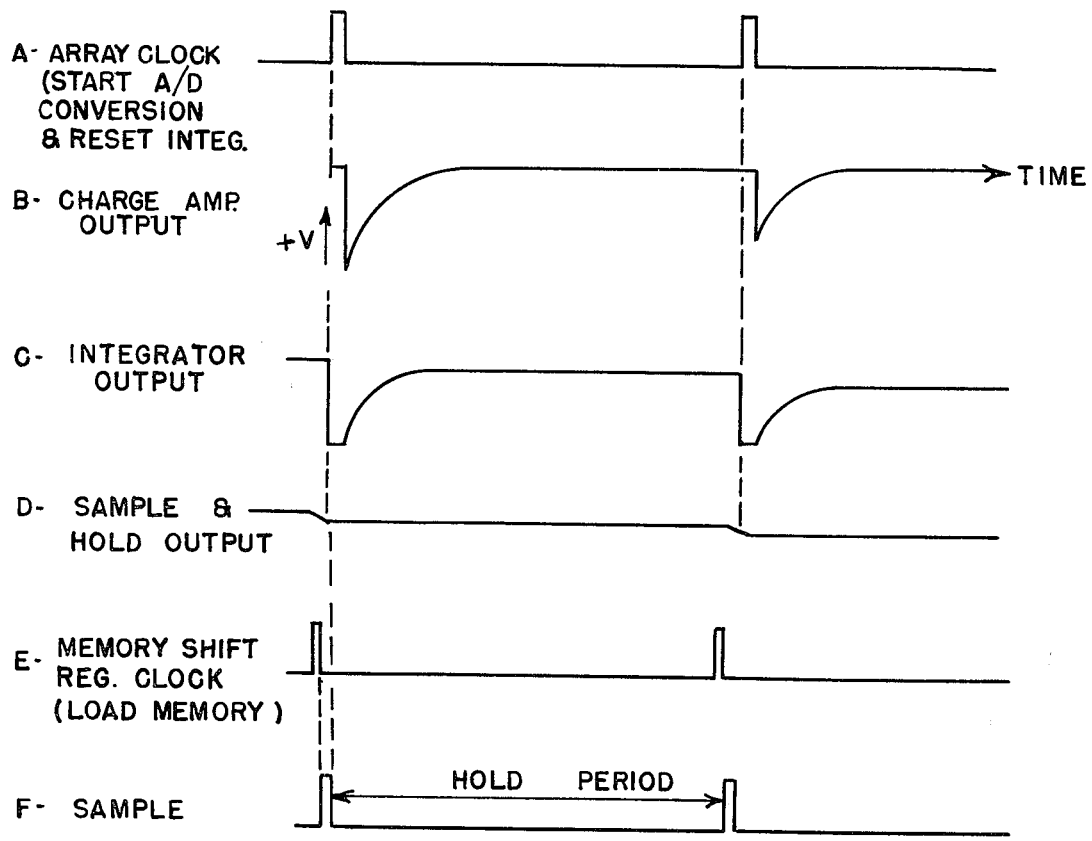
FIG. 3 is a timing diagram of the main video signal channel of the photodiode imaging system of FIG. 1.

As the diodes are continually scanned, the video output pulse of each diode will appear at the output of the amplifier 14 as shown in waveform B of FIG. 3. The area under each negative video output pulse is proportional to the intensity of the light on the diode during the last scan cycle. To obtain a signal proportional in amplitude to the intensity of the light, the video pulses are integrated in an integrator comprised of an operational amplifier 21 and feedback capacitor 22. The output of that integrator, shown in waveform C of FIG. 3, is then sampled at the end of the integration period and held as shown in waveform D until the next memory shift register clock pulse shown in waveform E of FIG. 3. Waveform F of FIG. 3 shows the SAMPLE pulse that is applied by the generator 17 to a sample-and-hold circuit 23. The ARRAY CLOCK pulses transmitted by the timing signal generator are also applied to the shift register 16 to advance the video scan to the next diode and to a transistor switch $Q_R$, to reset the integrator. Consequently, immediately after each SAMPLE pulse, the integrator is reset.

The output of the sample-and-hold circuit is applied to the display and/or record system 20 through a scaling differential amplifier comprised of an operational amplifier 24 having a differential input stage and feedback resistor 25. A fixed pattern noise compensation signal read from a shift register memory 26 is converted to analog form in a digital-to-analog (D/A) converter 27 and subtracted from the video output signal by the differential amplifier 24. The preferred manner in which the fixed pattern noise is measured and stored in the memory 26 will now be described.

First a cap 29 is placed over the optical scan lens system 11. That provides a uniform low level of illumination for all diodes that is virtually at absolute zero. Then a switch 30 is placed in a calibrate position to set a flip-flop, RQ, in the timing signal generator 17. Recalling that the shift register 16 is operating continuously after an initial START pulse (which in turn may be initiated by a start button being momentarily depressed once power is turned on) the purpose of this RQ flip-flop is to simply request a calibration scan cycle to begin with the next START pulse. Consequently, the RQ flip-flop is reset by the next START pulse. At the same time the RQ flip-flop is reset, a calibrate flip-flop, CLB, is set by the START pulse. The output signals RQ and CLB of those flip-flops are shown in waveforms C and D of FIG. 2.

The signal CLB enables an analog-to-digital converter 31 coupled to the sample-and-hold circuit 23 by an operational amplifier 32 having a fixed gain set by the ratio of a feedback resistor 33 to an input resistor 34 to scale the signal to the converter 31 as may be required. It also enables the shift register memory 26 to store the output of the converter 31 in successive memory locations starting with the first memory location and proceeding to successive memory locations in response to memory shift register clock pulses. That START pulse for a calibration scan is, of course, the one that sets the CLB flip-flop. The next START pulse resets the CLB flip-flop to terminate the store mode of operation for the memory 26. In that manner, the memory 26 will store the video output of each diode in digital form as the diodes are scanned once in sequence from $D_1$ through $D_N$.

When the CLB flip-flop is reset, all operation of the memory 26 is stopped until another calibrate operation is requested by operating the switch 30 to a STOP position and returning it to the CAL position, or until the switch 30 is placed in an operate (OP) position. Placing the switch 30 in the OP position will also set the RQ flip-flop to enable the next START pulse to set an operate flip-flop, OPT. The OPT flip-flop remains set until manually reset, as by turning the switch 30 to the STOP position, but not until the next START pulse. The waveform for the CLB flip-flop is also used in FIG. 2 to illustrate the output of the OPT flip-flop because it functions the same except for the way it is reset. However, the output signal of the OPT flip-flop is used differently. It sets the memory 26 to a read mode of operation so that as its memory locations are continually addressed in synchronism with successive scanning cycles of the diode array, the fixed pattern noise of each diode is read out once during each array scanning cycle.

The digital-to-analog converter 27 automatically converts the digital output of each successive memory location to analog form for subtraction from the video output of the corresponding diode. In that regard, it should be noted from the timing waveforms of FIG. 3 that the video output to the amplifier 24 from a given diode is not available until the memory shift register clock pulse occurs because the clock pulse period devoted to that diode is used for integrating the video pulse from the charge amplifier 14. Consequently, operation of the memory 26 is delayed virtually one clock pulse.

The actual read operation during an operate mode is timed by the SAMPLE pulse, but delayed for the period of the SAMPLE pulse less the inherent delay in the converter 27. In that manner fixed pattern noise signals are presented to the amplifier 24 in synchronism with video signals from the corresponding diodes via the sample-and-hold circuit 23. The necessary delay may be introduced by an adjustable monostable multivibrator at the read control input of the memory. The memory is advanced by the memory shift register clock (waveform E of FIG. 3) so that the memory is ready in time to have a noise compensation value read out.

During a calibrate mode of operation, i.e., during a write mode of operation for the memory, the write operation is delayed for a period of one clock time after a SAMPLE pulse, which is sufficient delay for a sample to be converted by the analog-to-digital converter 31. That converter begins operation when the array clock pulse occurs immediately following a SAMPLE pulse.

The memory 26 employed in this exemplary embodiment consists of a conventional recirculating memory comprised of a plurality of N-stage shift registers, one shift register for each bit of the converter output, operating in synchronism with the first N stages of the array shift register. In that case the recirculating memory operates in open loop during the calibrate mode of operation and in closed loop during the operate mode of operation. However, in other embodiments the memory may consist of a random access memory having memory locations addressed in sequence by an addressing shift register driven by the shift register clock pulses just as the shift register memory 26 is driven. In either case, the memory can be expanded for a rectangular array of diodes.

To expand the memory 26 for a rectangular array, one possibility is to provide N independent memories, one for each row of the diode array, each having N memory locations, and providing a counter responsive to START pulses to count the number of lines scanned. The output of the line counter would then advance the read, or write, operation from one memory to the next. The output of that line counter would be transmitted to the display and/or record system to advance the display and/or record control along from one line position to the next after each line scanned. One would also need an end-of-frame (EOF) pulse derived from the carry output of the line counter to synchronize the frames of the display and/or record system for repeated display, or to stop the entire scanning process in case the video display and/or record is for a single frame. In either case, display control in a direction normal to the scanned lines being displayed can be derived from the line counter.

In operation, the exemplary system of FIG. 1 is used as a still camera. The switch 30 is first placed in the CAL position. Then after sufficient time for calibration has been allowed (which could be indicated by a lamp energized by the CLB signal being extinguished), the system would be stopped by placing the switch 30 in the STOP position. That stops everything except for continuing to apply array clock pulses to the register 16. Thereafter, upon moving the switch to the OP position, the taking of the picture is begun. The memory read operation would begin with the next START pulse in a manner strictly analogous to the way calibration is started. For that reason the same waveform is used in FIG. 2 for OPT as for CLB, as noted hereinbefore. The display and/or record system would then also begin with the next START pulse after the signal OPT is applied to it. A linkage, or its electrical equivalent, returns the switch 30 to the STOP position once the full arc specified has been scanned by the optical scan system. The entire operation could then be repeated for another picture, with or without recalibration, taking care to manually reset the lens system. If another picture is not taken for some time, it would be desirable to recalibrate.

Figure 4:
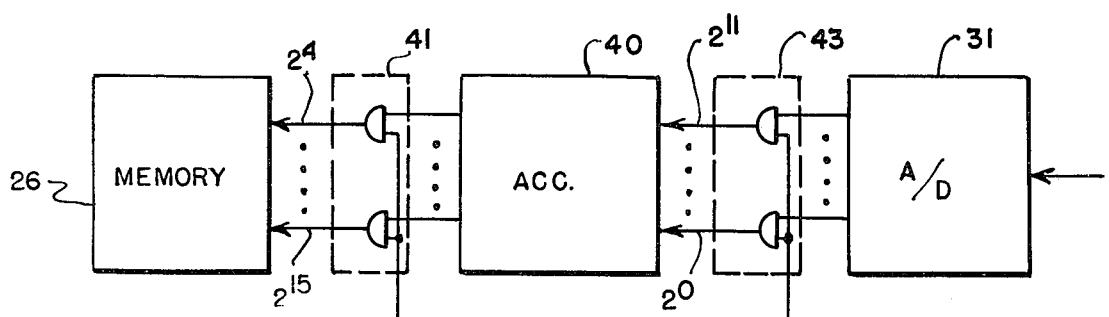
FIG. 4 is a block diagram of a system for obtaining a plurality of dark-noise signal measurements and storing an average of the measurements for fixed-pattern compensation.

Referring now to FIG. 4, a modification of the system of FIG. 1 will be described. The modification is for averaging a number of calibration scanning cycles in order to eliminate from the fixed pattern noise any random noise. An accumulator 40 is connected between the output of the analog-to-digital converter 31 and the memory 26 of FIG. 1. The output of the accumulator is connected to the memory through a bank of AND gates 41 which are enabled by the output of the last stage of a binary counter 42. Assuming that 16 scan cycles are to be averaged, the counter 42 is a 4-bit counter incremented by START pulses from the shift register 16. When 16 scan cycles have been completed, the counter 42 then sets a flip-flop FF which enables the AND gates 41 and disables a bank of AND gates 43 that connect the input terminals of the accumulator 40 to the analog-to-digital converter 31. After one additional array scan cycle the flip-flop is reset via the AND gate 44 which transmits a stop calibrate signal (STOP CLB) to the timing signal generator 17 that turns off the calibrate signal CLB which enables the counter 42.

The accumulator 40 is a conventional accumulator comprised of a plurality of recirculating registers operating in parallel, one recirculating register for each bit. Assuming 16 bits for the accumulator, there would be 16 shift registers, all of which recirculate in parallel through a parallel binary adder to which the AND gates 43 are connected. Assuming the analog-to-digital converter is provided with a 12-bit output, the AND gates 43 are connected to bit positions $2^0$ through $2^{11}$ of the adder at the addend inputs of the accumulator. The remaining addend inputs are wired to provide bit zeros at positions $2^{12}$ through $2^{15}$. The augend inputs to the adder are connected to the outputs of the shift registers at bit positions $2^0$ through $2^{15}$. In response to each SAMPLE pulse, applied through a suitable delay multivibrator, the shift registers are advanced, thus entering accumulated sums of diode noise measurements in the recirculating registers until a carry output appears from the last stage of the counter 42. The gates 43 are then disabled and the gates 41 are enabled, as noted hereinbefore, during the next scan cycle to gate into the memory the accumulated sums divided by 16 for storage as though that were the single calibration cycle of the system of FIG. 1. The next start pulse is then transmitted by the AND gate 44 as a STOP CLB signal to the timing signal generator 17 to stop the calibration mode of operation. The operate mode may then be initiated as before.

The step of dividing by 16 is carried out automatically by taking the 12-bit output for storage in memory from the twelve most significant bit positions $2^4$ through $2^{15}$. If a larger number of samples is to be averaged, a larger accumulator and a larger counter would be provided, and the outputs would still be taken from the 12 most significant bits. The only restriction on the number N of samples that may be averaged in this way is that N be some power of 2. Otherwise some more sophisticated system must be provided for adding and dividing by a number other than some power of 2. However, such more sophisticated systems are known, and if integrated circuit technology is used, such systems are economically feasible as well.

Figure 5A:
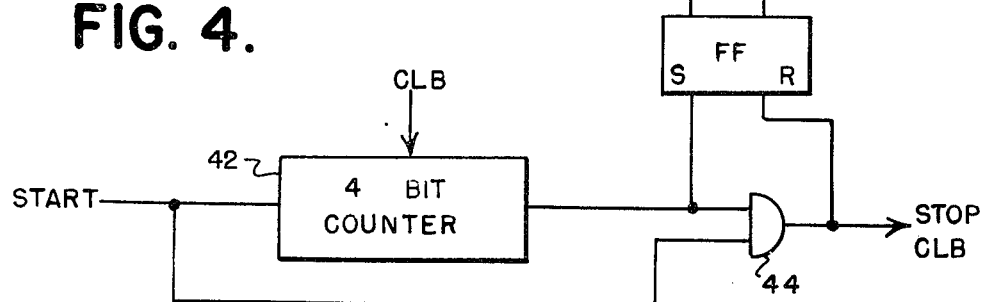
FIGS. 5a and 5b are graphs of video output as a function of illumination intensity for a pair of photodiodes before and after fixed-pattern noise compensation.
Figure 5A:
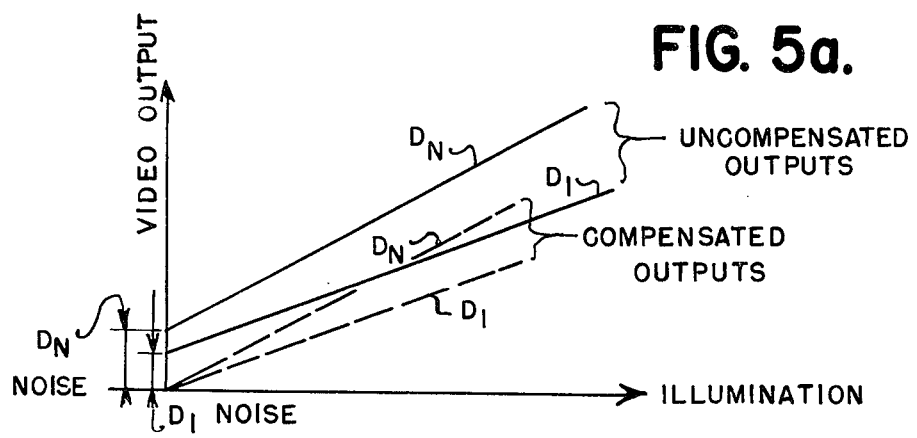

As indicated hereinbefore, the preferred way of making the fixed pattern noise measurements is with the optical scan system capped. The measurement at each diode is then of what is commonly referred to as "dark noise". As the dark noise of each diode is subtracted from its signal during normal operation for imaging, the video output of each diode has an amplitude that is a function of light intensity. A graph of that function with dark noise for two diodes $D_1$ and $D_N$ is shown with solid lines in FIG. 5a. The corrected function is then shown in dotted lines.

This fixed pattern dark noise compensation assures that the video output function for every diode will pass through the origin. Each may have a slightly different slope, as shown, due to a difference in the sensitivities of the diodes, but that may also be compensated in accordance with the teachings of a copending application filed concurrently by Richard M. Malueg and Michael J. Meir, titled PHOTODIODE ARRAY GAIN COMPENSATION, and assigned to the assignee of this application.

Figure 5B:
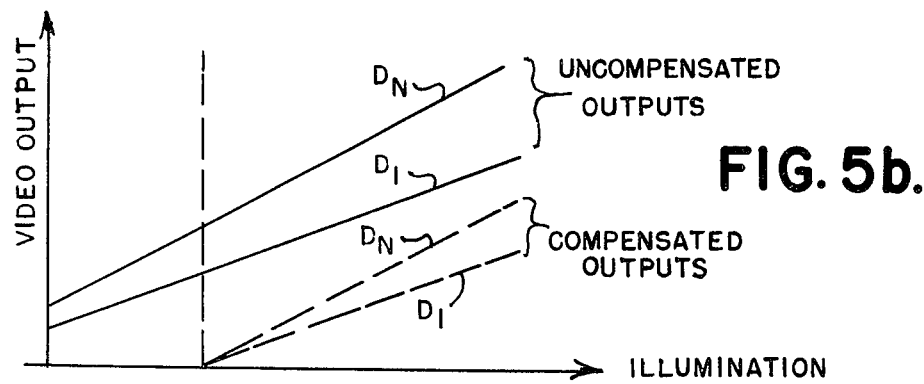

The fixed pattern noise measurement may also be made at a selected low level I of illumination as illustrated in FIG. 5b for the same diodes $D_1$ and $D_N$. This is less desirable than making dark noise measurements because all output for the array below the level I is then masked by the noise compensation since the resulting video output would be negative, as shown, below the illumination level I. Also for all levels above the level I, the video output levels will be proportionately lower as may be readily appreciated by comparison of FIGS. 5a and 5b. However, for some applications that may be acceptable.

Although particular embodiments of the invention have been described, it is recognized that other modifications and variations may readily occur to those skilled in the art. In particular, it is recognized that the concept of the present invention is applicable to arrays of detectors of all types, and not just to arrays of photodetectors. Consequently, it is intended that the invention be interpreted to include such and other modifications and variations, and that its scope be determined in accordance with the following claims.

What is claimed is:

1. A method for fixed-pattern noise compensation of a system employing an array of detectors, said method comprising the steps of
    measuring the output signal level of each detector under a uniformly low level of incident energy,
    storing the low-level signal value thus measured for each detector, and
    during a subsequent normal system operation, subtracting the stored low-level signal of each detector from the signal output of the respective detectors each time the detectors are addressed.

2. A method as defined in claim 1 wherein said signal level measurement of each detector made under a uniformly low level of incident energy is an average of a plurality of signal level measurements made under the same condition of incident energy.

3. A method as defined in claim 1 wherein said low level of incident energy is virtually at absolute zero.

4. A method as defined in claim 3 wherein said signal level measurement of each detector made under a uniformly low level of incident energy is an average of a plurality of signal level measurements made under the same condition of incident energy.

5. A method as defined in claim 1 wherein said detectors are photodetectors and said incident energy is light.

6. A method as defined in claim 5 wherein said photodetectors are p-n junction diodes.

7. Apparatus for compensation of fixed-pattern noise in a system employing an array of detectors, a system for focusing incident energy on said array, and switching devices for sequentially connecting said detectors to a common array output junction, comprising
    means for producing an output signal for each detector as each detector is connected to said common array output junction,
    means for providing a uniformly low level of incident energy to all detectors of said array,
    means for measuring the output signal of each detector during a calibration operation of said array under said uniformly low level of incident energy,
    means for storing as a compensation value the output signal value thus measured for each detector, and
    means for subtracting said stored compensation values from output signals of respective detectors each time the detectors are connected to said common junction during a subsequent normal system operation.

8. Apparatus as defined in claim 7 wherein said measuring means includes means for averaging a number of output signal measurements of each detector during said calibration operation, and producing said average for storage in said storing means as the compensation value of each detector.

9. Apparatus as defined in claim 7 wherein said low level of incident energy is provided by capping said lens system, thereby producing a uniformly low level of incident energy for said array at virtually absolute zero.

10. Apparatus as defined in claim 9 wherein said measuring means includes means for averaging a number of output signal measurements of each detector during said calibration operation, and producing said average for storage in said storing means as the compensation value of each detector.

11. Apparatus for compensation of fixed-pattern noise in an imaging system employing an array of photodetectors comprising
   means in place for providing a low-level of illumination uniformly incident on all photodetectors of said array,
   means for operating said array through at least one calibration cycle to obtain a separate video output signal from each photodetector with said first named means in place,
   means for converting each separate video output signal from each photodetector to digital form,
   means for storing each video output signal thus converted to digital form in a different electronic memory location, each memory location being associated with a separate one of said photodetectors,
   means for operating said imaging system in a normal manner with said means in place not in place to permit light images to reach said array,
   means for nondestructively reading out of said memory each of said stored digital video signals associated with each of said photodetectors from said associated memory locations as said array is operated in a normal manner,
   means for converting the digital signals as read from said memory to analog form to provide a compensation signal, and
   means for subtracting each compensation signal thus obtained for each photodetector from each video output signal obtained therefrom during said normal operation.

12. Apparatus of claim 11 including means for operating said array through a plurality of calibration cycles with said first named means in place and wherein each video output signal produced during said plurality of calibration cycles is converted to a digital form and averaged with all video output signals obtained from the same photodetectors during said plurality of calibration cycles and converted to digital form, and means for storing the average thus obtained from said plurality of calibration cycles for each photodetector in said storing means.

13. Apparatus as defined in claim 11 wherein said low level of illumination is provided by blocking all light from said array.

14. Apparatus as defined in claim 13 including means for operating said array through a plurality of calibration cycles with said first named means in place and wherein each video output signal produced during said plurality of calibration cycles is converted to a digital form and averaged with all video output signals obtained from the same photodetectors during said plurality of calibration cycles and converted to digital form, and means for storing the average thus obtained from said plurality of calibration cycles for each photodetector in said storing means.

* * * * *